United States Patent [19]
Kim et al.

[11] Patent Number: 6,100,372
[45] Date of Patent: Aug. 8, 2000

[54] MONOCARBOXYLIC ACID-TERMINATED POLYMERS OF CARBON DIOXIDE AND AN ALKYLENE OXIDE

[75] Inventors: Ki-Soo Kim, Katonah, N.Y.; Sophia Dashevsky, Fair Lawn, N.J.; Claude B. Peterson, Middletown, N.Y.

[73] Assignee: Akzo Nobel NV, Arnhem, Netherlands

[21] Appl. No.: 09/137,919

[22] Filed: Aug. 20, 1998

[51] Int. Cl.[7] .................................................. C08G 65/08
[52] U.S. Cl. ........................... 528/405; 528/370; 528/421
[58] Field of Search ..................................... 528/370, 405, 528/196, 421

[56] References Cited

U.S. PATENT DOCUMENTS

| | | | |
|---|---|---|---|
| 3,248,415 | 4/1966 | Stevens | 260/463 |
| 4,066,630 | 1/1978 | Dixon et al. | 260/77.5 D |
| 4,137,280 | 1/1979 | Dixon et al. | 260/873 |
| 4,488,982 | 12/1984 | Cuscurida et al. | 252/174.21 |
| 4,665,136 | 5/1987 | Santangelo et al. | 525/523 |
| 4,686,276 | 8/1987 | Myers | 528/371 |
| 4,745,162 | 5/1988 | Harris | 525/461 |
| 4,866,143 | 9/1989 | Gagnon et al. | 525/409 |
| 4,895,970 | 1/1990 | Harris | 558/248 |
| 4,943,677 | 7/1990 | Rokicki | 528/405 |
| 4,948,845 | 8/1990 | Gagnon et al. | 525/409 |
| 4,956,424 | 9/1990 | Harris | 525/462 |
| 5,015,753 | 5/1991 | Harris | 558/260 |
| 5,232,633 | 8/1993 | Ilardi et al. | 252/554 |

FOREIGN PATENT DOCUMENTS

95/06077  3/1995  WIPO .

OTHER PUBLICATIONS

C. Ovalles et al., "Synthesis, Characterization, and Surface Activity of Surfactants Derived from Nonylphenol, Ethylene Oxide and Carbon Dioxide", J. Dispersion Science and Technology, 17(4), 353–366 (1996).

*Primary Examiner*—Robert Dawson
*Assistant Examiner*—D. Aylward
*Attorney, Agent, or Firm*—Richard P. Fennelly

[57] ABSTRACT

A polymer composition, which is useful as a surfactant, formed by the reaction of an alkylene oxide (such as ethylene oxide), carbon dioxide, and a monocarboxylic acid chain terminator, such as one containing a fatty alkyl group.

9 Claims, No Drawings

MONOCARBOXYLIC ACID-TERMINATED POLYMERS OF CARBON DIOXIDE AND AN ALKYLENE OXIDE

BACKGROUND OF THE INVENTION

The prior art describes a variety of polymer systems formed by reaction of carbon dioxide and an alkylene oxide.

In U.S. Pat. No. 3,248,415 to H. C. Stevens it is taught that high molecular weight polycarbonates can be formed from carbon dioxide and 1,2-epoxides. These polycarbonates are terminated with hydroxyl groups as taught at Col. 1, lines 42–46.

More recent U.S. Pat. No. 4,745,162 to R. F. Harris describes the synthesis of surfactants which are poly (alkylene carbonate) polyahls having an acid-terminal moiety. These compounds are alcohol terminated species and are of the general formula $$R-(OC(O)OC_2H_4OC_2H_4)_m-(OC_2H_4)_n-(OI)_k-OH$$

where R is alkyl, such as fatty alkyl, and where m can range from about 1 to about 40, n can range from about 0 to 200, and k can range from about 0 to about 8. The moiety I is an unsubstituted or substituted residue from a diol or polyol. Acid-functional poly(alkylene carbonate) polyahls are obtained by the reaction of the alcohol terminated species with diacids.

SUMMARY OF THE INVENTION

The present invention relates to a polymer composition formed by the reaction of an alkylene oxide, carbon dioxide, and a monocarboxylic acid chain terminator.

DESCRIPTION OF PREFERRED EMBODIMENTS OF THE INVENTION

The present invention relies upon the reaction of carbon dioxide, alkylene oxide (preferably ethylene oxide), and monocarboxylic acid chain terminator to yield, in a preferred embodiment, a final product of the formula $$RC(O)O(R'OC(O)O)_m-(R'O)_n)_x-H$$

where R is alkyl, preferably fatty alkyl containing from about eight to about eighteen carbon atoms, where R' is an alkylene group containing two or three carbon atoms, where m and n range from 1 to about 30, and where x ranges from about 1 to about 30. These compositions have a molecular weight which ranges from about 500 to about 4,000. The ratio of carbonate ("m") to ether linkages ("n") in these compositions ranges from about 5:95 to about 60:40 and the end group ratio of fatty acid to hydroxy ranges from about 15:85 to about 40:60.

The product of the present invention can be formed using the techniques that have been generally used in making the types of differing carbon dioxide/alkylene oxide polymer compositions known to the prior art. A wide variety of catalysts may be employed in the preparation of the compositions of the instant invention. Among the well-known catalysts that have been found to be useful are zinc salts, such as zinc glutarate. It is also possible to employ the following additional materials as a catalyst for the reaction: an alkali carbonate, such as sodium, potassium and/or calcium carbonate; an alkali hydroxide, such as sodium potassium and/or calcium hydroxide; or a tertiary amine, such as one or more of the n-alkyl morpholines. It is also possible to employ an alkali metal and/or an alkaline earth stannate, such as sodium stannate trihydrate and potassium stannate trihydrate. The catalyst can be used at from about 0.5% to about 15%, by weight of the alkylene oxide used in the reaction.

Suitable alkylene oxide reagent(s) for use in the present invention include such epoxides as ethylene oxide, propylene oxide and 1,2-butylene oxide.

Suitable monofunctional carboxylic acid chain terminators include the $C_2$–$C_{20}$ alkyl carboxylic acids. Preferred for use are the $C_8$–$C_{18}$ alkyl carboxylic acids, such as lauric acid, stearic acid and oleic acid. However, other carboxylic acids may also be employed.

A preferred solvent for use in carrying out the reaction is methylene chloride, but other solvents may be used for the polymerization reaction. If desired, no solvent can be used.

In carrying out the reaction, the alkylene oxide, chain terminator, catalyst, solvent (if employed) and carbon dioxide are charged to a reaction vessel designed to withstand elevated pressure. With the reaction vessel sealed, the temperature is raised to a temperature within the range of from about 60° C. to about 150° C., preferably about 110° C.–130° C. The pressure is maintained during the reaction with carbon dioxide at from about 100 to about 800 psig, preferably 150–350 psig.

The compositions of the present invention are useful as surfactants. Preferably, the chain terminator has a hydrophobic group (e.g., fatty alkyl) whereas the rest of the structure of the oligomer is hydrophilic (and potentially biodegradable) due to the presence of moieties from the carbon dioxide reagent.

The present invention is illustrated by the Examples that follow.

EXAMPLE 1

This Example illustrates the preparation of a catalyst for use in a polymerization reaction to make a product in accordance with the present invention.

A solution of 50 g of glutaric acid in 200 ml of methanol was slowly added to a stirred slurry of 25 g zinc oxide in 175 ml of methanol. Upon completion of the acid addition, stirring was maintained, and the mixture was heated to 60° C. and held for four hours. The solids were removed by filtration, were washed twice with 250 ml methanol and were dried in vacuum at 60° C. for twelve hours.

EXAMPLE 2

This Example illustrates a polymerization reaction to make a product in accordance with the present invention utilizing the catalyst made in Example 1.

The polymerization was run in a one liter autoclave equipped with a stirrer, thermocouple, gas inlets and a vent. The general polymerization procedure was as follows: First, 10.2 g of zinc glutarate and a chain terminator, lauric acid (2.5 g), were charged to the autoclave, the autoclave was closed, and the closed autoclave was purged with a small flow of nitrogen for four hours at 95° C. Then, the system was charged with 300 ml of the solvent methylene chloride, 100 grams of ethylene oxide and was pressurized with 100 psi of $CO_2$. The autoclave was then heated to the desired reaction temperature of 120° C. The autoclave was then charged with additional $C_2$ up to a pressure of 260–450 psi, and the $CO_2$ gas feed was not shut off so that the pressure was maintained.

At the end of the reaction, the reactor was cooled to room temperature, and the pressure was released. In order to distill off the ethylene oxide before opening the autoclave, it was then heated up again to 60° C. with the vent line to the scrubber open. Table 1, in the next Example, shows the reaction conditions that were employed.

EXAMPLE 3

This Example illustrates the recovery and purification procedure that was employed.

The methylene chloride-containing polymer and oligomer were treated as follows: First, methylene chloride was again added up to about 300 ml, if necessary. The catalyst was removed with two washings of 3.7 wt % HCl using a separatory funnel. This was washed using two additional water washes, two washes with 0.1 M NaOH, and finally with two water washes. The washes were followed by the separation of the polymer into two portions: a methanol soluble and a methanol-insoluble portion. This was done by slowly adding the methylene chloride solution into methanol under stirring. The methanol insoluble portion was removed and was dried in a vacuum oven. In this Example, the methanol soluble portion was the only desired product and was isolated by evaporation of solvents. The polymerization conditions and characterization data of the methanol soluble products are listed in the following Table 1:

TABLE 1

Polymerization condition and methanol soluble product characteristics

| | Conditions | | | | Product | | | |
|---|---|---|---|---|---|---|---|---|
| Run # | LA gram | Time Hrs | Temp ° C. | Press psi | MeOH sol gram | LA/ OH | MW g/mole | Structure m:n |
| 1 | 2.5 | 18 | 123 | 266 | 51.1 | 16/84 | 1100 | 13:97 |
| 2 | 5.0 | 18 | 119 | 258 | 31.1 | 39/61 | 400 | 8:92 |
| 3 | 1.25 | 18.5 | 120 | 267 | 40.8 | 14/86 | 900 | 13:67 |
| 4 | 5 | 18 | 120 | 350 | 34.9 | 37/63 | 600 | 13:87 |
| 5 | 5 | 18 | 120 | 450 | 32.3 | 40/60 | 700 | 15:85 |

Notes:
all Runs used 10.2 grams of zinc glutarate catalyst.
MW and m:n ratios: determined by NMR.
Structure: ratio of carbonate (m) and ether (n) linkages.
LA: lauric acid.
LA/OH: ratio of terminal end groups determined by NMR.

EXAMPLE 4

This Example shows the surface properties of the methanol soluble products formed in the previous Example.

A Fisher Autotensionmat surface tension analyzer measured the surface tension. The critical micelle concentration (CMC), along with the surface tension of the samples are given in Table 2. The products having a low CMC and a low surface tension indicate that they have good surface properties:

TABLE 2

Surface properties of $CO_2$ oligomers

| | Surface properties | |
|---|---|---|
| Run # | CMC, g/100 ml | Surface tension @ 0.1 wt %, mN/m |
| 1 | 0.025 | 33.3 |
| 2 | 0.014 | 28.8 |

TABLE 2-continued

Surface properties of $CO_2$ oligomers

| | Surface properties | |
|---|---|---|
| Run # | CMC, g/100 ml | Surface tension @ 0.1 wt %, mN/m |
| 3 | 0.028 | 31.4 |
| 4 | 0.023 | 32.5 |
| 5 | 0.025 | 31.2 |

Example 5

The general polymerization and product recovery procedures of Examples 2 and 3 are used in this Example.

In this Example, all polymerizations were run at the lower temperatures of 60–95° C. and yielded methanol soluble product as well as methanol insoluble high polymers. Tables 3 and 4 show the polymerization conditions and product characteristics.

TABLE 3

Polymerization condition and methanol-soluble product characteristics

| | Conditions | | | Product yield | | MeOH soluble product | | |
|---|---|---|---|---|---|---|---|---|
| | | | | MeOH | MeOH | | | MW |
| Run # | Time hrs | Temp ° C. | Press psi | insol gram | Sol gram | $\eta_{inh}$ ml/g | g/ mole | Structure m:n |
| 6 | 4 | 85 | 350 | 16.5 | 7.8 | 0.41 | 1400 | 17:83 |
| 7 | 6 | 95 | 200 | 31.1 | 12.1 | 0.20 | 900 | 45:55 |
| 8 | 4 | 60 | 800 | 7.9 | 3.4 | 0.092 | 1000 | 80:20 |
| 9 | 4 | 85 | 350 | 49.3 | 6.4 | 0.305 | 2100 | 28:72 |
| 10 | 4 | 85 | 350 | 36.1 | 5.8 | 0.12 | 900 | 55:45 |

Notes:
Run 4:
Ratio: catalyst/chain terminator = 10 g/l g.
MW: determined by NMR
Structure: ratio of carbonate (m) and ether (n) linkages.

TABLE 4

Surface properties of $CO_2$ oligomers

| | Surface Properties | |
|---|---|---|
| Run # | CMC, g/100 ml | Π, mN/m |
| 6 | 0.01 | 44 |
| 7 | 0.002 | 42 |
| 9 | 0.01 | 42 |
| 10 | 0.005 | 48 |

Note:
Π = $\gamma_{solvent}$ - $\gamma_{solvent}$. For water, a $\gamma_{solvent}$ of 72 mN/m has been used. For $\gamma_{solvent}$, the average of the values with a higher concentration than the CMC has been used.

EXAMPLE 6

The following Table shows respective percentages of biodegradation of alkylene carbonate oligomers tested by Closed Bottle Tests according to the test guidelines of the OECD (Ecotoxicology and Environmental Safety 24, 319–327 (1992)):

| Sample # | m/n | R/OH | Mn | Biodegradation (%) | | | | |
|---|---|---|---|---|---|---|---|---|
| | | | | 0 day | 7 days | 14 days | 21 days | 28 days |
| 6 | 14/86 | 23/77 | 2,400 | 0 | 3 | 20 | 40 | 52 |
| 4 | 28/72 | 57/43 | 2,100 | 0 | 15 | 40 | 47 | 57 |
| 7 | 43/53 | 53/47 | 1,400 | 0 | 20 | 38 | 55 | 63 |
| 5 | 55/45 | 52/48 | 900 | 0 | 45 | 67 | 72 | 78 |

The samples had the following structural formula of $$R-\{[C_2H_4OC(O)O]_m-[C_2H_4O]_n\}_x-H$$

where $R=CH_3(CH_2)_{10}C(O)O-$; m=1–5; n=1–25; and x=1–30.

The results indicate that all of the tested alkylene carbonate oligomers were biodegradable.

COMPARATIVE EXAMPLE 6

This Example is given to provide a comparison between the present invention and certain disclosure contained in U.S. Pat. No. 4,745,162 to R. F. Harris, Examples Nos. 1 and 2.

Ethylene carbonate (33.2 g, 0.38 mole), n-dodecyl alcohol (5.96 g, 0.037 mole) and sodium stannate trihydrate catalyst (0.38 g) were added to a three-neck flask equipped with a stirrer, condenser, thermometer, and the resulting reaction mixture was maintained under nitrogen atmosphere while it was heated to 160° C. for twenty-one hours. After reaction, the catalyst was removed by stirring the product with acetone (100 ml) and 4 g of CELATOM FW-60 filter agent over a period of three hours, followed by filtration and solvent removal. The yield of product was 20.7 g.

NMR analysis showed that the product had the following characteristics: ratio of carbonate:ether linkages—36:64; ratio of end groups of dodecyl:OH—42:58; molecular weight —600 g/mole; and surface tension—36.2 mN/m; and CMC—0.016 g/100 ml.

The preceding Examples are intended to illustrate only certain embodiments of the present invention and, for that reason, are not intended to be construed in a limiting sense. The scope of protection sought is set forth in the Claims that follow.

We claim:

1. A polymer composition formed by the reaction of an alkylene oxide, carbon dioxide, and a monocarboxylic acid chain terminator.

2. A composition as claimed in claim 1 wherein the chain terminator contains a fatty alkyl group.

3. A composition as claimed in claim 1 wherein the alkylene oxide is ethylene oxide.

4. A composition as claimed in claim 1 wherein the alkylene oxide is ethylene oxide and the chain terminator is a monocarboxylic acid containing from about eight to about eighteen carbon atoms in its alkyl group.

5. A polymer composition of the structure $$RC(O)O(R'OC(O)O)_m-(R'O)_n)_x-H$$

where R is fatty alkyl containing from about eight to about eighteen carbon atoms, R' is alkylene containing two or three carbon atoms, where m and n are from 1 to about 30, where x is from about 1 to about 30, and where the ratio of m to n is from about 5:95 to about 60:40.

6. A composition as claimed in claim 5 where R' contains two carbon atoms.

7. A composition as claimed in claim 5 where R' contains three carbon atoms.

8. A composition as claimed in claim 5 where R' contains two carbon atoms, R is fatty alkyl containing from about eight to about eighteen carbon atoms, and the ratio of m to n ranges from about 5:95 to about 60:40.

9. A composition as claimed in claim 5 where R' contains three carbon, R is fatty alkyl containing from about eight to about eighteen carbon atoms, and the ratio of m to n ranges from about 5:95 to about 60:40.

* * * * *